(12) United States Patent
Lee et al.

(10) Patent No.: US 9,326,162 B2
(45) Date of Patent: Apr. 26, 2016

(54) METHOD AND APPARATUS FOR LIMITING TRANSMISSION OF IN-DEVICE COEXISTENCE INDICATION MESSAGE IN WIRELESS COMMUNICATION SYSTEM

(71) Applicant: LG ELECTRONICS INC., Seoul (KR)

(72) Inventors: Jae Wook Lee, Anyang-si (KR); Sung Jun Park, Anyang-si (KR); Sung Hoon Jung, Anyang-si (KR); Young Dae Lee, Anyang-si (KR); Seung June Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 13/796,910

(22) Filed: Mar. 12, 2013

(65) Prior Publication Data

US 2013/0242830 A1    Sep. 19, 2013

Related U.S. Application Data

(60) Provisional application No. 61/612,209, filed on Mar. 16, 2012.

(51) Int. Cl.
*H04W 24/02* (2009.01)
*H04W 72/12* (2009.01)
*H04W 88/06* (2009.01)

(52) U.S. Cl.
CPC .......... *H04W 24/02* (2013.01); *H04W 72/1215* (2013.01); *H04W 88/06* (2013.01)

(58) Field of Classification Search
None
See application file for complete search history.

(56) References Cited

U.S. PATENT DOCUMENTS

| 2012/0040620 A1* | 2/2012 | Fu et al. ................... 455/63.1 |
| 2012/0069766 A1* | 3/2012 | Fu et al. ................... 370/252 |
| 2012/0252442 A1* | 10/2012 | Fu ........................ H04W 24/10 455/426.1 |
| 2013/0090142 A1 | 4/2013 | Lee et al. |
| 2013/0114516 A1* | 5/2013 | Koo et al. ................ 370/329 |
| 2013/0203418 A1* | 8/2013 | Jang et al. ............... 455/436 |

FOREIGN PATENT DOCUMENTS

| GB | 2489702 A | 10/2012 |
| WO | WO 2011/123550 A1 | 10/2011 |
| WO | WO 2012/023734 A2 | 2/2012 |
| WO | WO 2012/130175 A1 | 10/2012 |
| WO | WO 2013/085256 A1 | 6/2013 |
| WO | WO 2013/100658 A1 | 7/2013 |
| WO | WO 2013/112010 A1 | 8/2013 |
| WO | WO 2013/119017 A1 | 8/2013 |

* cited by examiner

*Primary Examiner* — Awet Haile
*Assistant Examiner* — Kent Krueger
(74) *Attorney, Agent, or Firm* — Birch, Stewart, Kolasch & Birch, LLP

(57) ABSTRACT

A method and apparatus of communicating in a mobile communication system is provided. A user equipment (UE) receives an configuration message including information on an in-device coexistence (IDC) indication from the base station. The UE determines whether or not to transmit an IDC indication message based on the received information on the IDC indication, and transmits the IDC indication message to the base station if it is determined to transmit the IDC indication message based on the received information on the IDC indication.

20 Claims, 8 Drawing Sheets

METHOD AND APPARATUS FOR LIMITING TRANSMISSION OF IN-DEVICE COEXISTENCE INDICATION MESSAGE IN WIRELESS COMMUNICATION SYSTEM

CROSS-REFERENCE TO RELATED APPLICATION

This application claims the benefit of priority of U.S. Provisional application No. 61/612,209 filed on Mar. 16, 2012, which is incorporated by reference in its entirety herein.

BACKGROUND OF THE INVENTION

1. Field of the Invention

The present invention relates to wireless communications, and more particularly, to a method and apparatus for limiting a transmission of in-device coexistence indication message in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Meanwhile, due to an in-device industrial, scientific and medical (ISM) transmitter, a 3GPP LTE radio can be interfered in case that the 3GPP LTE radio and an ISM radio coexist within the same device operating in adjacent frequencies. For example, when the LTE radio is working on band 40 and the ISM radio such as wireless local area network WLAN) is active in a same device at the same time, the LTE radio in Rx mode is interfered by the ISM transmitter. Also, the transmission of the LTE radio can interfere the reception of the ISM/GNSS (global navigation satellite system) radio.

As a remedy for avoiding above in-device coexistence (IDC) interference, three possible LTE network-controlled user equipment (UE)-assisted solutions are suggested and captured in 3GPP TR 36.816, which are FDM, TDM, power control (PC) solution. From the LTE point of view, the FDM solution is to move the interfered LTE to another serving frequency. The TDM solution is to ensure that transmission of a radio signal does not coincide with reception of another radio signal. The PC solution is to reduce the LTE transmission power to mitigate the interference to ISM/GNSS receiver.

Depending on the solution, the necessary information included in the IDC indication message is different. For the FDM solution, the UE may indicate which frequencies are unusable due to in-device coexistence. For the TDM solutions, the UE may signal the necessary information, e.g. interferer type, mode, and possibly the appropriate offset in subframes to the eNB. The UE may also signal a suggested pattern to the eNB. For the PC solution, the UE may notify the network of interference type, power reduction value, etc.

When the UE transmits IDC indication message, the network is expected to perform the FDM solution or the TDM solution. Regarding to when the UE transmits the IDC indication message, various methods may be proposed. However, due to the difficulty in measuring IDC interference and defining specific IDC indication triggering conditions for various scenarios, triggering depending on UE implementation seems to be considered preferable. If the triggering is based on the UE implementation, badly implemented UE may transmit too many IDC indication messages regardless of a severity of the IDC interference. Currently there is no way to prevent this kind of bad behavior.

Accordingly, there is need to transmit the IDC indication message efficiently.

SUMMARY OF THE INVENTION

The present invention provides a method and apparatus for limiting a transmission of in-device coexistence indication message in a wireless communication system. The present invention provides a method for configuring of allowance for a user equipment (UE) to transmit an in-device coexistence (IDC) indication message.

In an aspect, a method of communicating, by a user equipment (UE), with a base station in a mobile communication system is provided. The method includes receiving, by the UE, an configuration message including information on an in-device coexistence (IDC) indication from the base station, determining, by the UE, whether or not to transmit an IDC indication message based on the received information on the IDC indication, and transmitting, by the UE, the IDC indication message to the base station if it is determined to transmit the IDC indication message based on the received information on the IDC indication.

In another aspect, a method of communicating, by a base station, with a user equipment (UE) in a mobile communication system is provided. The method includes transmitting, by the base station, a configuration message including information on an in-device coexistence (IDC) indication to the UE, and receiving, by the base station, an IDC indication message from the UE if the UE is determined to transmit the IDC indication message based on the transmitted information on the IDC indication by the base station.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
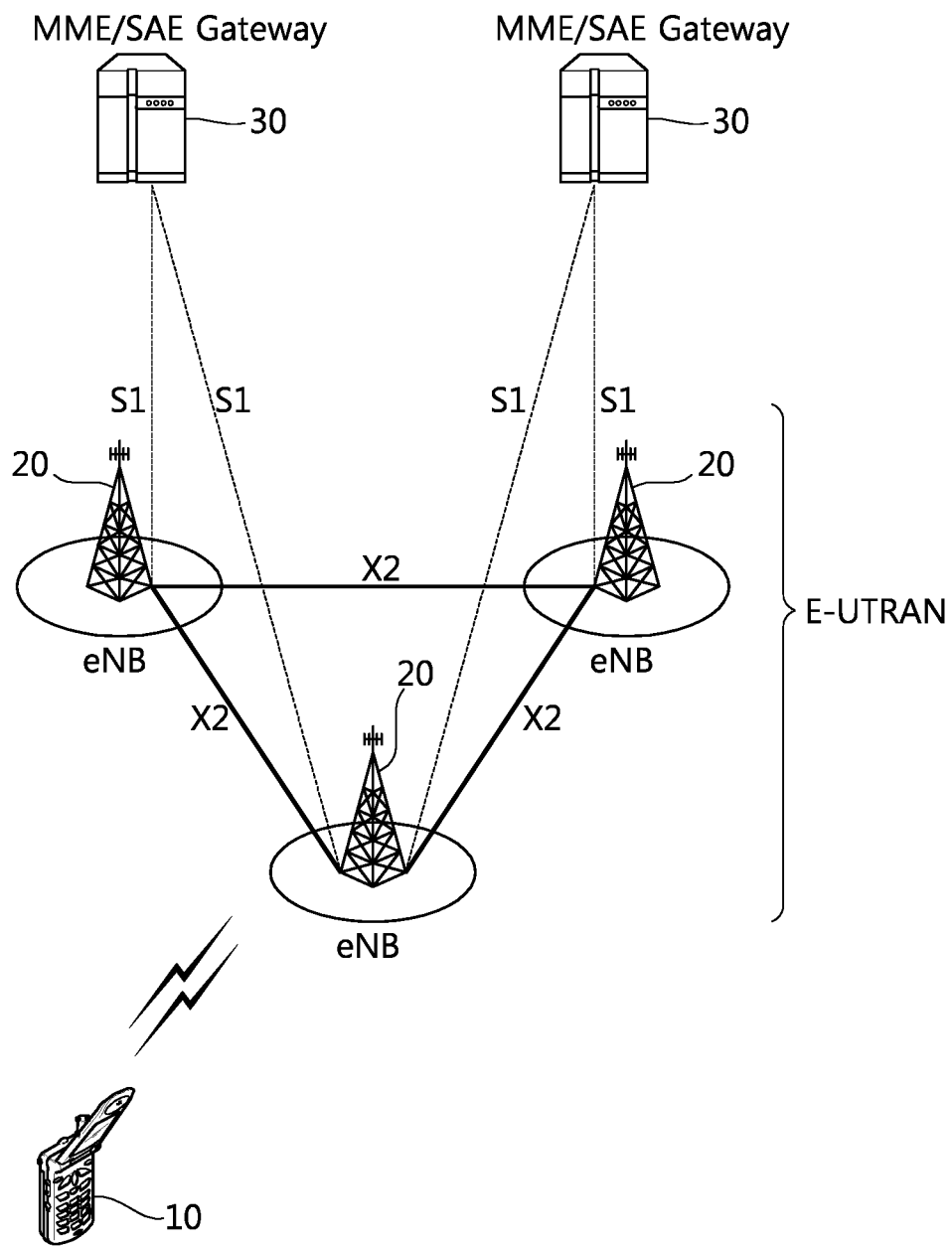
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 may be generally a fixed station that communicates with the UE 10 and may be referred to as another terminology, such as an evolved node-B (eNB), a base transceiver system (BTS), an access point, etc. There may be one or more cells within the coverage of the BS 20. A single cell may be configured to have one of bandwidths selected from 1.25, 2.5, 5, 10, and 20 MHz, etc., and may provide downlink or uplink transmission services to several UEs. In this case, different cells may be configured to provide different bandwidths.

Interfaces for transmitting user traffic or control traffic may be used between the BSs 20. The UE and the BS may be connected by means of a Uu interface. The BSs 20 may be interconnected by means of an X2 interface. The BSs 20 may be connected to an evolved packet core (EPC) by means of an S1 interface. The EPC may consist of a mobility management entity (MME), a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The MME is in charge of functionality of a control plane. The S-GW is in charge of functionality of a user plane. The BSs 20 may be connected to the MME 30 by means of an S1-MME interface, and may be connected to the S-GW by means of an S1-U interface. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
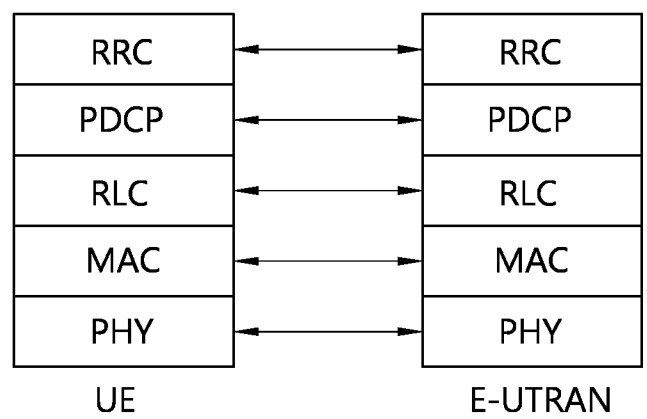
FIG. 2 is a diagram showing a radio interface protocol architecture for a control plane.
Figure 3:
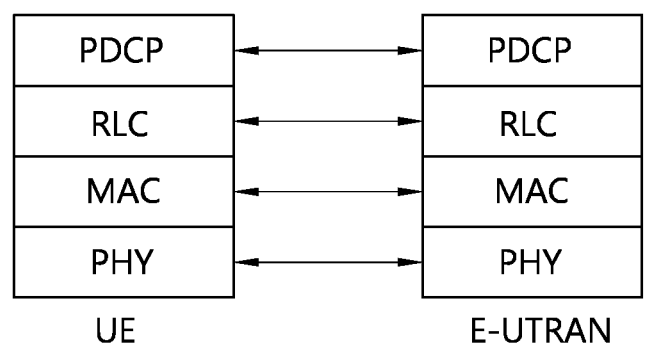
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN are classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane which is a protocol stack for control signal transmission and a user plane which is a protocol stack for data information transmission. The layers of the radio interface protocol may exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data may be transferred between the MAC layer and the PHY layer through the transport channel. The transport channel may be classified according to how and with what characteristics data is transmitted through a radio interface. Or, the transport channel may be classified into a dedicated transport channel and a common transport channel depending on whether or not to share the transport channel. Between different PHY layers, i.e., a PHY layer of a transmitter and a PHY layer of a receiver, data may be transferred through the physical channel. The physical channel may be modulated using an orthogonal frequency division multiplexing (OFDM) scheme, and utilizes time and frequency as a radio resource.

The PHY layer may use several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH carries a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
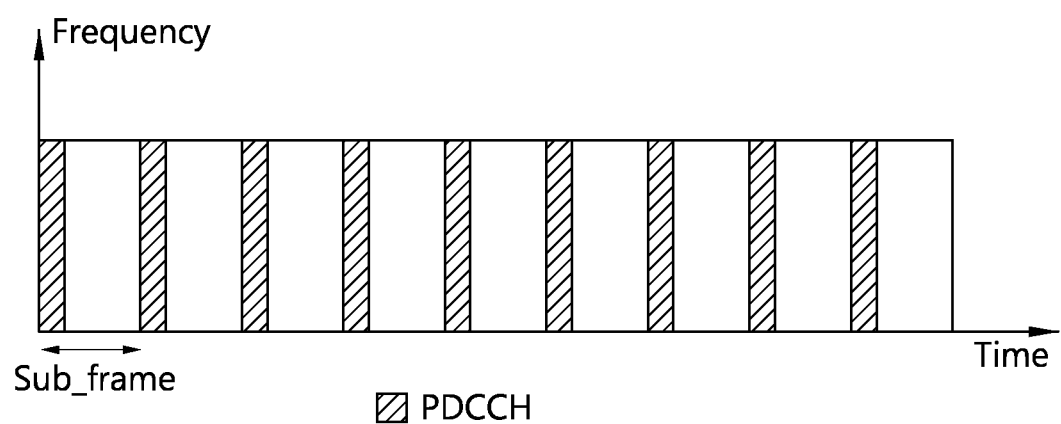
FIG. 4 shows an example of a physical channel structure.

FIG. 4 shows an example of a physical channel structure.

A physical channel may consist of a plurality of subframes in a time domain and a plurality of subcarriers in a frequency domain. One subframe may consist of a plurality of symbols in the time domain. One subframe may consist of a plurality of resource blocks (RBs). One RB may consist of a plurality of symbols and a plurality of subcarriers. In addition, each subframe may use specific subcarriers of specific symbols of a corresponding subframe for a PDCCH. For example, a first symbol of the subframe may be used for the PDCCH. A transmission time interval (TTI) which is a unit time for data transmission may be equal to a length of one subframe.

A DL transport channel for transmitting data from the network to the UE may include a broadcast channel (BCH) for transmitting system information, a paging channel (PCH) for transmitting a paging message, a DL-SCH for transmitting user traffic or control signals, etc. The system information may carry one or more system information blocks. All system information blocks may be transmitted with the same periodicity. Traffic or control signals of a multimedia broadcast/multicast service (MBMS) may be transmitted through the DL-SCH or a multicast channel (MCH). Meanwhile, a UL transport channel for transmitting data from the UE to the network may include a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel may be divided into a control channel for delivering information of the control plane and a traffic channel for delivering information of the user plane. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether the RRC of the UE is logically connected to the RRC of the E-UTRAN. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED state has the RRC connection established with the E-UTRAN, the E-UTRAN can recognize the existence of the UE in the RRC_CONNECTED and can effectively control the UE. Meanwhile, the UE in the RRC_IDLE state cannot be recognized by the E-UTRAN, and a core network (CN) manages the UE in unit of a tracking area (TA) which is a larger area than a cell. That is, only the existence of the UE in the RRC_IDLE state is recognized in unit of a large area, and the UE must transition to the RRC_CONNECTED state to receive a typical mobile communication service such as voice or data communication.

When the user initially powers on the UE, the UE first searches for a proper cell and then remains in the RRC_IDLE state in the cell. When there is a need to establish an RRC connection, the UE which remains in the RRC_IDLE state may establish the RRC connection with the RRC of the E-UTRAN through an RRC connection procedure and then may transition to the RRC_CONNECTED state. The UE which remains in the RRC_IDLE state may need to establish the RRC connection with the E-UTRAN when uplink data transmission is necessary due to a user's call attempt or the like or when there is a need to transmit a response message upon receiving a paging message from the E-UTRAN.

The UE which remains in the RRC_IDLE state can persistently perform cell reselection to find a better cell. In this case, the UE can perform measurement and cell reselection by using frequency priority information. That is, the UE can determine which frequency will be preferentially considered when performing frequency measurement and cell reselection on the basis of the frequency priority information. The UE can receive the frequency priority information by using system information or an RRC connection release message, or can receive the frequency priority information from another RAT in inter-RAT cell reselection.

Hereinafter, measuring and measurement reporting will be described.

It is necessary to support mobility of a UE in a mobile communication system. Therefore, the UE can persistently measure quality of a serving cell which currently provides a service and quality of a neighbor cell. The UE can report a measurement result to a network at a proper time, and the network can provide optimal mobility to the UE by using a handover or the like. For this, a base station can configure information regarding the measuring and the measurement reporting to the UE. The information regarding the measuring and measurement reporting may include a measurement object, a reporting configuration, a measurement identity, a quantity configuration, a measurement gap, etc.

Measurement object: It indicates a target for which the UE performs measurement. The target for which the UE performs measurement can be classified into three types, i.e., intra-frequency measurement for a cell having a center frequency equal to that of a serving cell, inter-frequency measurement for a cell having a center frequency different from that of the serving cell, and inter-radio access technology (RAT) measurement for a heterogeneous network. The heterogeneous network may include a GSM/EDGE radio access network (GERAN) and a UMTS terrestrial radio access network (UTRAN) conforming to a 3GPP standard specification and a CDMA 2000 system conforming to a 3GPP2 standard specification.

Reporting configuration: It includes a reporting criterion indicating a criterion for performing measurement reporting and a reporting format indicating the content included in the measurement reporting. The reporting criterion can be classified into an event-based trigger type and a periodical-based trigger type. In the event-based trigger type, the measurement reporting is performed when a predetermined specific condition is satisfied. In the periodical-based trigger type, when the UE acquires information desired by the eNB, the information is first reported to the eNB, and thereafter reporting is performed whenever a specific time elapses. The event-based trigger type may include various events such as A1 (a case where the quality of the serving cell is better than a threshold), A2 (a case where the quality of the serving cell is worse than the threshold), A3 (a case where the quality of the neighbor cell is better than that of a PCell by an offset), A4 (a case where the quality of the neighbor cell is better than the threshold), A5 (a case where the quality of the PCell is worse than a threshold 1 and the quality of the neighbor cell is better than a threshold 2), A6 (a case where the quality of the neighbor cell is better than that of an SCell by the offset), B1 (a case where the quality of an inter-RAT neighbor cell is better than the threshold), B2 (a case where the quality of the PCell is worse than the threshold 1 and the quality of the inter-RAT neighbor cell is better than the threshold 2), etc.

Measurement identity: It indicates a linkage which links a measurement object and a reporting configuration.

Quantity configuration: It indicates information on filtering performed for the measurement result of the UE.

Measurement gap: It indicates a duration in which the UE is allowed to perform measurement. UL and DL data transmissions are not achieved in the measurement gap.

Hereinafter, in-device coexistence (IDC) problem will be described.

In order to allow users to access various networks and services ubiquitously, an increasing number of UEs are equipped with multiple radio transceivers. For example, a UE may be equipped with LTE, Wi-Fi, Bluetooth transceivers, and GNSS receivers. One resulting challenge lies in trying to avoid coexistence interference between those collocated radio transceivers.

Figure 5:
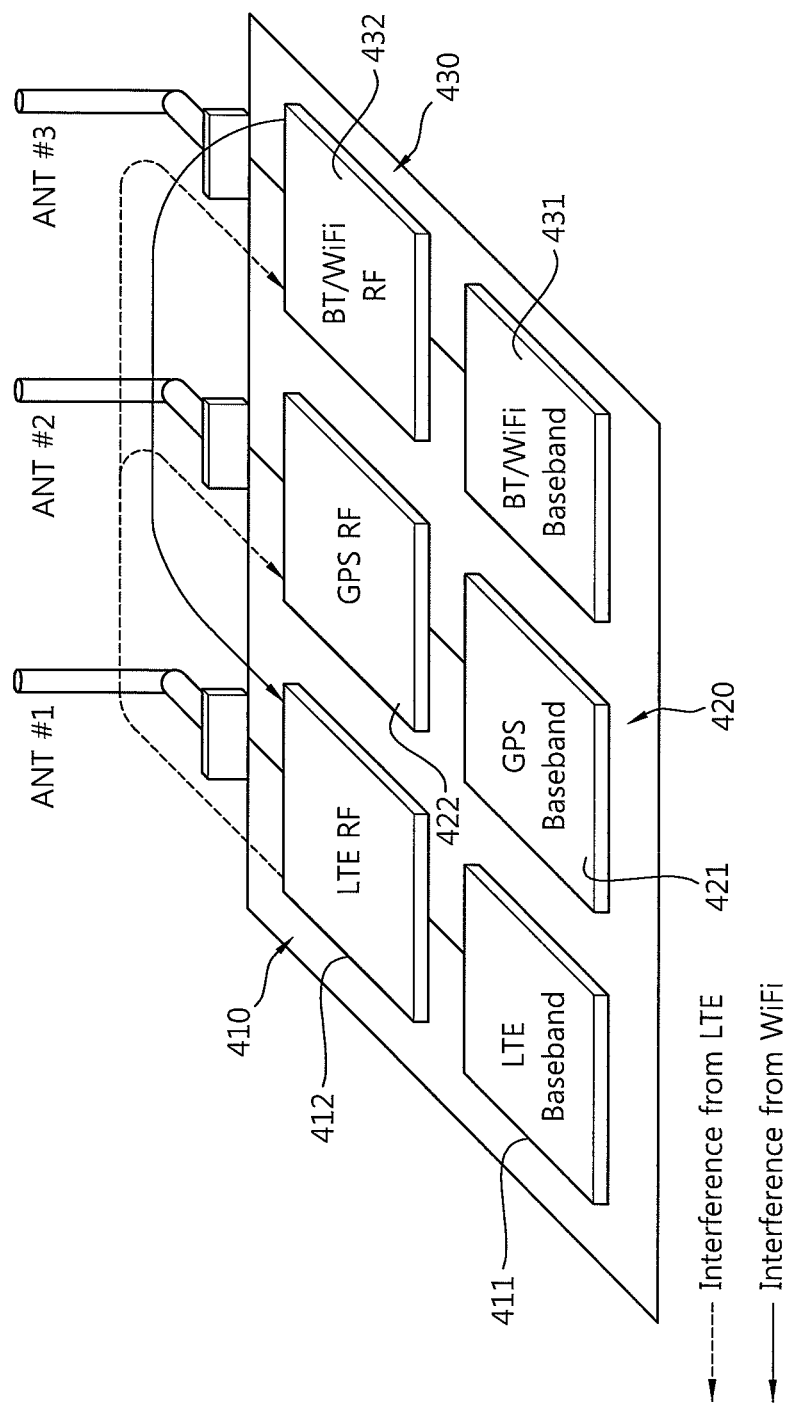
FIG. 5 shows an example of coexistence interference within the same UE.

FIG. 5 shows an example of coexistence interference within the same UE.

A LTE module 410 includes a LTE baseband 411 and a LTE radio frequency (RF) 412. A GNSS module 420 includes a GNSS baseband 421 and a GNSS RF 422. A Wi-Fi module 430 includes a Wi-Fi baseband 431 and a Wi-Fi RF 432.

Due to extreme proximity of multiple radio transceivers within the same UE, the transmit power of one transmitter may be much higher than the received power level of another receiver. Accordingly, different RATs within the same UE operating on adjacent frequencies causes interference to each other. For example, if all of the LTE module 410, the GNSS module 420 and the Wi-Fi module 430 are switched on, the LTE module 410 may interfere the GNSS module 420 and the Wi-Fi module 430. Or the Wi-Fi module 430 may interfere the LTE module 410. The LTE module 410 can measure the IDC interference by cooperating with other radio modules or by inter/intra frequency measurements.

Coexistence scenarios are due to adjacent frequencies between different radio technologies. To describe coexistence interference scenarios between LTE radio and other radio technologies, 3GPP frequency bands around 2.4 GHz industrial, scientific and medical (ISM) bands are considered.

Figure 6:
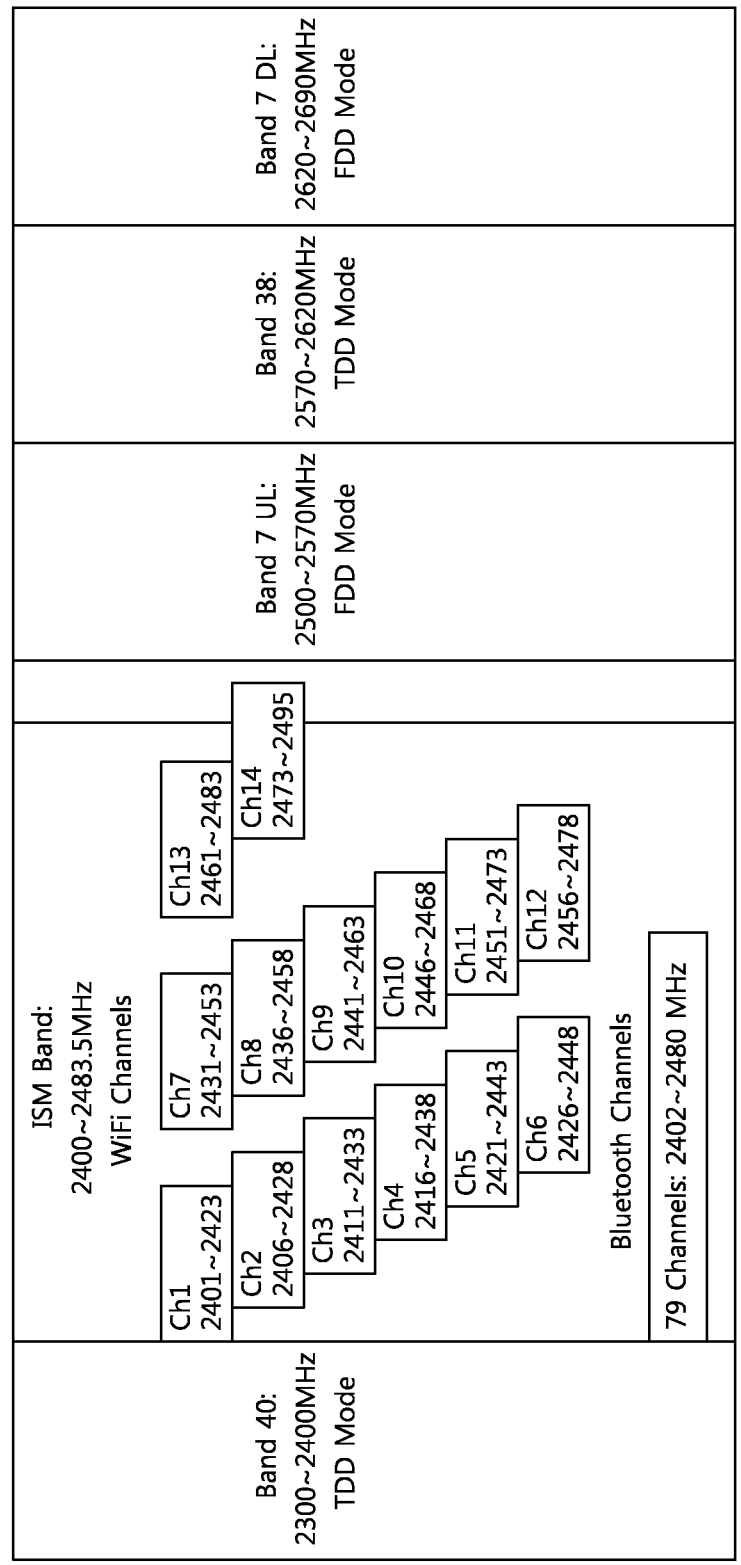
FIG. 6 shows 3GPP frequency bands around ISM band.

FIG. 6 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

The transmitter of LTE band 7/13/14 may cause interference to the receiver of GNSS at 1575.42 MHz.

From the viewpoint of a UE, three modes are considered to avoid interference. First, in an uncoordinated mode, different radio technologies within the same UE operate independently without any internal coordination between each other. Second, in a UE-coordinated mode, there is an internal coordination between the different radio technologies within the same UE, which means that at least the activities of one radio is known by other radio. However, the network is not aware of the coexistence issue possibly experienced by the UE and is therefore not involved in the coordination. Third, in a network-coordinated mode, different radio technologies within the UE are aware of possible coexistence problems and the UE can inform the network about such problems. It is then mainly up to the network to decide how to avoid coexistence interference.

The UE transmits an IDC indication message to the eNB when an IDC problem occurs to a higher extent than a specific level. However, the UE may transmit the IDC indication message unnecessarily many times according to a UE implementation. Therefore, rare radio resources may be wasted. In addition, when many UEs are implemented in this manner and thus the IDC indication message is transmitted unnecessarily many times, a cell may be overloaded. However, a method capable of controlling such a situation has not been proposed yet.

Therefore, a method of limiting the UE to transmit the IDC indication message is proposed. This method comprises that UE receives the IDC indication configuration message from the network, measures/assesses the configured measurement objects, and transmits the IDC indication message and IDC-related information to the network only if the IDC indication is configured.

Figure 7:
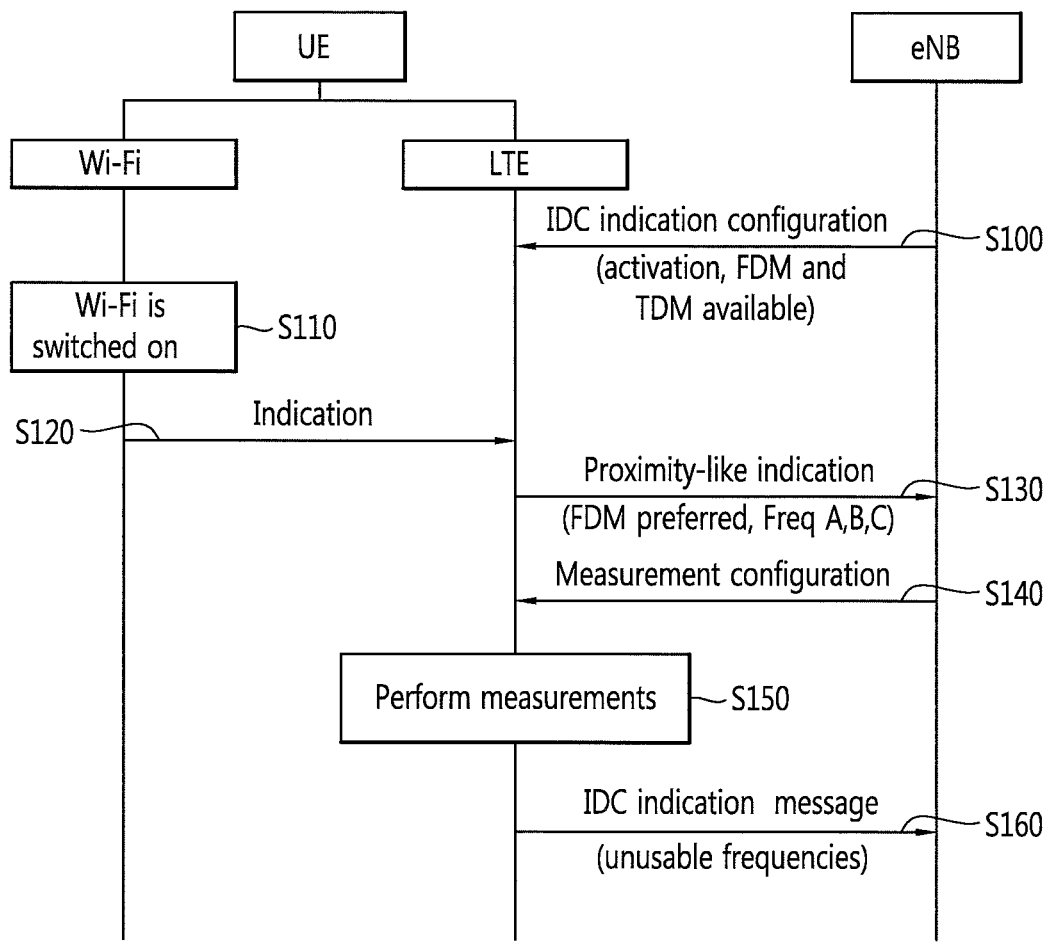
FIG. 7 shows an example of a method for limiting a transmission of an IDC indication message according to an embodiment of the present invention.

FIG. 7 shows an example of a method for limiting a transmission of an IDC indication message according to an embodiment of the present invention.

At step S100, the eNB transmits an IDC indication configuration message to the UE. The IDC indication configuration message may be transmitted to the UE via dedicated signaling. The IDC indication configuration message may be included in an RRC connection reconfiguration message.

The IDC indication configuration message may include information which indicates the UE whether the transmission of IDC indication message, by the UE, is allowed or not. In other words, the eNB may be able to activate or deactivate the transmission of IDC indication message, by the UE, with the IDC indication configuration message. The information which indicates the UE whether the transmission of IDC indication message, by the UE, is allowed or not may be represented by an activation bit that indicates permission for the UE to transmit the IDC indication message to the eNB. The UE who is allowed by the IDC indication configuration message is able to transmit the IDC indication message to the eNB. On the other hand, the UE who is not allowed by the IDC indication configuration message or does not receive the IDC indication configuration message is not able to transmit the IDC indication message to the eNB even if the IDC problem occurs in serving or non-serving frequency.

In addition, the eNB informs the UE that the FDM solution and the TDM solution are available in this cell by the IDC indication configuration message. The IDC indication configuration message may include an FDM/TDM preference configuration which the eNB informs the UE of preference between assistant information for the FDM solution and assistant information for the TDM solution depending on the network situation. If the FDM solution is preferred, the UE includes FDM information in the IDC indication message when the IDC problem occurs. If the TDM solution is preferred, the UE includes TDM information in the IDC indication message when the IDC problem occurs. The FDM/TDM preference configuration may indicate availability for the FDM/TDM solution in the serving network. The FDM information may include unusable frequencies and candidate target cell information. The FDM information may also include a direction of the IDC problem. The direction of the IDC problem may be classified into "LTE", which means that an LTE module is interfered by other coexisting technology, "Other", which means that other coexisting technology is interfered by the LTE module, and "Both", which means that the LTE module and other coexisting technology are interfered by each other. And, the TDM information may include unusable frequencies and desired pattern for discontinuous reception (DRX), bitmap solution or gap based solution.

At step S110, the Wi-Fi module within the UE is switched on in order to transmit the data. Here, the Wi-Fi module is only an example of other coexisting technologies which interferes the LTE module within the UE. The other coexisting technology which interferes the LTE module within the UE may be a Bluetooth module or a GNSS module.

At step S120, the Wi-Fi module within the UE makes the LTE module within the UE know that the Wi-Fi is module within the UE turned on through an inter-coordination.

At step S130, if the transmission of the IDC indication message is activated (or allowed) by the received IDC configuration indication message, the LTE module within the UE transmits a proximity-like indication message which includes the (potentially) interfered frequencies due the Wi-Fi module within the UE. And, the proximity-like indication message may include a bit that indicates the FDM solution is preferred.

At step S140, after receiving the proximity-like indication message, the eNB configures measurements for the preparation of the FDM solution by transmitting a measurement configuration message.

At step S150, the LTE module within the UE performs the measurements according to the received measurement configuration message.

At step S160, if the transmission of IDC indication message is activated (or allowed), the LTE module within the UE transmits the IDC indication message that includes unusable frequencies with on-going interference. The UE who is allowed by the received IDC indication configuration message is able to transmit the IDC indication message and IDC-related information to the eNB. On the other hand, the UE who is not allowed by the received IDC indication configuration message or does not receive the IDC indication configuration message is not able to transmit the IDC indication message to the eNB even if the IDC problem occurs in serving or non-serving frequency.

The IDC indication message may include an IDC indication which indicates that there is a potential or on-going IDC problem. This IDC indication may include assistant information for the FDM solution or the TDM solution.

The IDC indication message may include a proximity-like indication which informs the eNB of turn-on of coexisting technology within the UE. The proximity-like indication may be included in the IDC indication message if the module of other coexisting technology is switched on, or if a session (or application) of the module of other coexisting technology comes into being active, or if the LTE module within the UE receives the indication of potential in-device interference from other coexisting technology within the UE or applications.

The proximity-like indication may include the preference of the UE between the FDM solution and the TDM solution depending on the UE situation. That is to say, the UE may indicate to the eNB that the FDM solution is preferred sometimes. At other times, the UE may indicate to the eNB that the TDM solution is preferred. In FIG. 7, the FDM solution is preferred. The proximity-like indication may also include potential unusable frequencies. The potential unusable frequency is a frequency that the interference from other coexisting technology to the LTE module within the UE or the interference from the LTE module within the UE to other coexisting technology is expected due to an active state of other coexisting technology.

Figure 8:
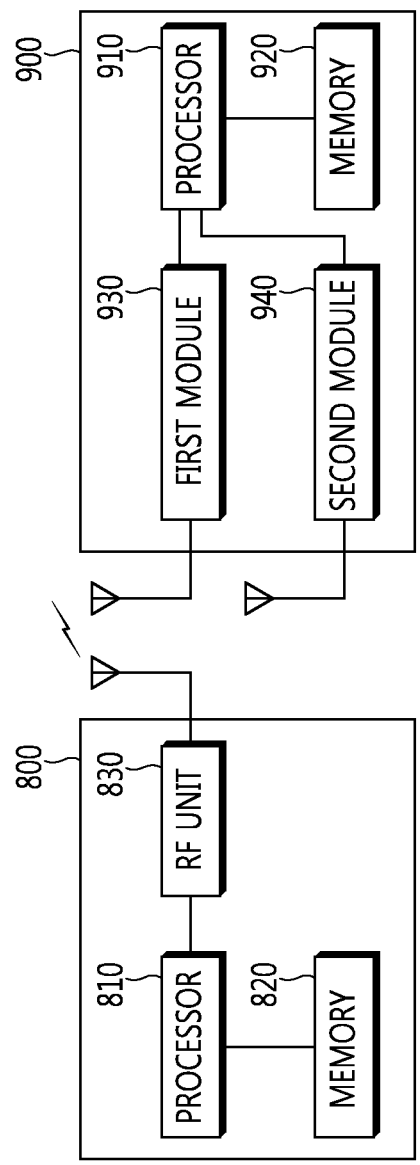
FIG. 8 is a block diagram showing wireless communication system to implement an embodiment of the present invention.

FIG. 8 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920, a first module 930, and a second module 940. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The first module 930 is operatively coupled with the processor 910, and transmits and/or receives a radio signal for a first communication system. The second module 930 is operatively coupled with the processor 910, and transmits and/or receives a radio signal for a second communication system.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF unit 830, the first module 930, and the second module 940 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of communicating, by a user equipment (UE), with a base station in a mobile communication system, the method comprising:
   receiving, by the UE from the base station, a configuration message including an in-device coexistence (IDC) indication; and
   transmitting, by the UE to the base station, an IDC indication message if the UE determines that the received IDC indication contains specific information,
   wherein the specific information is indicated by an activation bit,
   wherein the activation bit represents permission for the UE to transmit the IDC indication message,
   wherein the IDC indication message includes time division multiplexing (TDM) assistant information, and frequency division multiplexing (FDM) assistant information,
   wherein the TDM assistant information includes bitmap solution information, and
   wherein the FDM assistant information includes information on unusable frequencies, and information on whether a long-term evolution (LTE) module in the UE is interfered by other coexisting technology modules in the UE or other coexisting technology modules in the UE are interfered by the LTE module in the UE.

2. The method of claim 1, wherein the configuration message is received via dedicated signaling.

3. The method of claim 1, wherein the configuration message includes an FDM/TDM preference configuration which indicates an availability for an FDM/TDM solution in a serving network.

4. The method of claim 3, wherein if the FDM solution is available, the IDC indication message further includes candidate target cell information.

5. The method of claim 3, wherein if the TDM solution is available, the IDC indication message further includes a desired pattern for discontinuous reception (DRX).

6. The method of claim 1, wherein the IDC indication message includes a proximity-like indication which informs the base station of turn-on of coexisting technology within the UE.

7. The method of claim 6, wherein the proximity-like indication includes the preference of the UE between a frequency division multiplexing (FDM) solution and a TDM solution depending on a situation of the UE.

8. The method of claim 6, wherein the proximity-like indication includes potential unusable frequencies, a potential unusable frequency being a frequency that interference from the coexisting technology within the UE is expected.

9. The method of claim 6, the proximity-like indication is included in the IDC indication message if the coexisting technology within the UE is switched on, or if an application of the coexisting technology comes into being active.

10. The method of claim 1, further comprising:
    not transmitting the IDC indication message if the UE determines that the received IDC indication does not contain the specific information.

11. A method of communicating, by a base station, with a user equipment (UE) in a mobile communication system, the method comprising:
    transmitting, by the base station to the UE, a configuration message including an in-device coexistence (IDC) indication; and
    receiving, by the base station from the UE, an IDC indication message if the UE determines that the transmitted IDC indication contains specific information,
    wherein the specific information is indicated by an activation bit,
    wherein the activation bit represents permission for the UE to transmit the IDC indication message,
    wherein the IDC indication message includes time division multiplexing (TDM) assistant information, and frequency division multiplexing (FDM) assistant information,
    wherein the TDM assistant information includes bitmap solution information, and
    wherein the FDM assistant information includes information on unusable frequencies, and information on whether a long-term evolution (LTE) module in the UE is interfered by other coexisting technology modules in the UE or other coexisting technology modules in the UE are interfered by the LTE module in the UE.

12. The method of claim 11, wherein the configuration message is transmitted via dedicated signaling.

13. The method of claim 11, wherein the configuration message includes an FDM/TDM preference configuration which indicates an availability for an FDM/TDM solution in a serving network.

14. The method of claim 13, wherein if the FDM solution is available, the IDC indication message further includes candidate target cell information.

15. The method of claim 13, wherein if the TDM solution is available, the IDC indication message further includes a desired pattern for discontinuous reception (DRX).

16. The method of claim 11, wherein the IDC indication message includes a proximity-like indication which informs the base station of turn-on of coexisting technology within the UE.

17. The method of claim 16, wherein the proximity-like indication includes the preference of the UE between a frequency division multiplexing (FDM) solution and a TDM solution depending on a situation of the UE.

18. The method of claim 16, wherein the proximity-like indication includes potential unusable frequencies, a potential unusable frequency being a frequency that interference from the coexisting technology within the UE is expected.

19. The method of claim 16, the proximity-like indication is included in the IDC indication message if the coexisting technology within the UE is switched on, or if an application of the coexisting technology comes into being active.

20. The method of claim 11, further comprising:
    not receiving the IDC indication message if the UE determines that the received IDC indication does not contain the specific information.

* * * * *